(12) United States Patent
Kim et al.

(10) Patent No.: US 8,724,491 B2
(45) Date of Patent: May 13, 2014

(54) METHOD AND APPARATUS FOR MEASURING CELL IN A WIRELESS COMMUNICATION SYSTEM

(75) Inventors: Sun Hee Kim, Gyeonggi-do (KR); Kyung Jun Lee, Gyeonggi-do (KR); Seung June Yi, Gyeonggi-do (KR); Sung Hoon Jung, Gyeonggi-do (KR); Sung Duck Chun, Gyeonggi-do (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 490 days.

(21) Appl. No.: 12/917,075

(22) Filed: Nov. 1, 2010

(65) Prior Publication Data

US 2011/0103249 A1  May 5, 2011

Related U.S. Application Data

(60) Provisional application No. 61/257,427, filed on Nov. 2, 2009, provisional application No. 61/258,183, filed on Nov. 4, 2009.

(30) Foreign Application Priority Data

Oct. 12, 2010 (KR) ........................ 10-2010-0099228

(51) Int. Cl.
 *H04J 1/16* (2006.01)

(52) U.S. Cl.
 USPC .......................................... 370/252

(58) Field of Classification Search
 USPC .......................................... 370/252
 See application file for complete search history.

(56) References Cited

U.S. PATENT DOCUMENTS

| | | | |
|---|---|---|---|
| 6,912,394 B1 * | 6/2005 | Obata et al. | 455/450 |
| 2006/0252377 A1 * | 11/2006 | Jeong et al. | 455/67.13 |
| 2010/0098001 A1 * | 4/2010 | Yang et al. | 370/329 |
| 2011/0065393 A1 * | 3/2011 | Pekonen et al. | 455/67.11 |
| 2011/0103249 A1 * | 5/2011 | Kim et al. | 370/252 |

FOREIGN PATENT DOCUMENTS

EP         1845749 A2 * 10/2007 .......... H04W 276/02

* cited by examiner

*Primary Examiner* — Hassan Kizou
*Assistant Examiner* — Ashil Farahmand
(74) *Attorney, Agent, or Firm* — Morgan, Lewis & Bockius LLP

(57) ABSTRACT

A method and apparatus for measuring a cell a wireless communication system are disclosed. The method includes receiving measurement configuration information for a plurality of frequencies from a BS, without a dedicated connection between a UE and a network, and measuring cells using the plurality of frequencies according to the measurement configuration information.

7 Claims, 10 Drawing Sheets

METHOD AND APPARATUS FOR MEASURING CELL IN A WIRELESS COMMUNICATION SYSTEM

This application claims the benefit of Korean Patent Application No. 10-2010-0099228, filed on Oct. 12, 2010, which is hereby incorporated by reference as if fully set forth herein.

This application also claims the benefit of U.S. Provisional Application Ser. Nos. 61/257,427, filed on Nov. 2, 2009, and 61/258,183, filed on Nov. 4, 2009, the content of which is hereby incorporated by reference herein in their entirety.

BACKGROUND OF THE INVENTION

1. Field of the Invention

The present invention relates to a wireless communication system, and more particularly, to a method and apparatus for measuring a cell in a wireless communication system.

2. Discussion of the Related Art

With reference to FIG. 1, a Universal Mobile Telecommunications System (UMTS) network configuration will be described below.

FIG. 1 illustrates a UMTS network configuration. Referring to FIG. 1, a UMTS system includes a User Equipment (UE), a UMTS Terrestrial Radio Access Network (UTRAN), and a Core Network (CN). The UTRAN includes one or more Radio Network Sub-systems (RNSs) each having a Radio Network Controller (RNC) and one or more Node Bs managed by the RNC. A Node B manages one or more cells.

A radio protocol architecture for the UMTS system will be described with reference to FIG. 2. FIG. 2 illustrates a radio protocol architecture for UMTS. Radio protocol layers are defined in pairs for a UE and a UTRAN, for wireless data transmission. Layer 1 (or L1), the PHYsical (PHY) layer transmits data on a radio link in various wireless transmission techniques. The PHY layer is connected to its higher layer, the MAC layer via transport channels. The transport channels are divided into dedicated transport channels and common transport channels depending on whether they are shared.

The MAC layer, the Radio Link Control (RLC) layer, the Packet Data Convergence Protocol (PDCP) layer, and the Broadcast and Multicast Control (BMC) layer are defined at Layer 2 (or L2). The MAC layer maps logical channels to transport channels and multiplexes a plurality of logical channels onto one transport channel.

The MAC layer is connected to a higher layer, the RLC layer via logical channels. The logical channels are divided into control channels and traffic channels according to the types of information that they carry. The control channels carry control-plane information and the traffic channels carry user-plane information. The control channels include a Common Control Channel (CCCH) carrying common control information, a Dedicated Control Channel (DCCH) carrying control information to a specific UE, a Broadcast Control Channel (BCCH) carrying system information common to a cell, and a Paging Control Channel (PCCH) carrying a paging message. The traffic channels include a Dedicated Traffic Channel (DTCH) carrying user-plane data to a specific UE.

The MAC layer is branched into a MAC-b sublayer, a MAC-d sublayer, a MAC-c/sh sublayer, a MAC-hs/ehs sublayer, and a MAC-e/es or MAC-i/is sublayer depending on the types of specific transport channels that they manage. The MAC-b sublayer manages a Broadcast Channel (BCH) that broadcasts system information, the MAC-c/sh sublayer manages a Forward Access Channel (FACH) that is a common transport channel shared among different UEs, and the MAC-d sublayer manages a Dedicated Channel (DCH) that is a dedicated transport channel for a specific UE. The MAC-hs/ehs sublayer manages a High Speed Downlink Shared Channel (HS-DSCH) that is a transport channel used to transmit high-speed downlink data, and the MAC-e/es or MAC-i/is sublayer manages an Enhanced Dedicated Channel (E-DCH) that is a transport channel used to transmit high-speed uplink data.

The RLC layer ensures the Quality of Service (QoS) of Radio Bearers (RBs) and is responsible for data transmission. The RLC layer has one or two independent RLC entities for each RB in order to ensure QoS. To support various QoS levels, the RLC layer provides three RLC modes, Transparent Mode (TM), Unacknowledged Mode (UM), and Acknowledged Mode (AM). In addition, the RLC layer controls a data size to suit radio data transmission at a lower layer. For controlling a data size, the RLC layer segments or concatenates data received from a higher layer.

The PDCP layer is located above the RLC layer. The PDCP layer enables efficient data transmission in IP packets such as IP version 4 (IPv4) or IP version 6 (IPv6) packets on a radio link having a relatively narrow bandwidth. For this purpose, the PDCP layer performs header compression. Since only necessary information is transmitted in the header of data header through header compression, the transmission efficiency of the radio link is increased. The PDCP layer exists mainly in a Packet Switched (PS) domain because header compression is it basic function. To provide an efficient header compression function for each PS service, one PDCP entity is defined for each RB. However, if the PDCP layer exists in a Circuit Switched (CS) domain, the PDCP layer does not provide the header compression function.

The BMC layer is also above the RLC layer, for scheduling a cell broadcast message and broadcasting the cell broadcast message to UEs within a specific cell.

The Radio Resource Control (RRC) layer, which is located at the lowest part of Layer 3 (or L3), is defined only on the control plane. The RRC layer is involved in establishing, reestablishing, and releasing RBs, controls L1 or L2 parameters, and controls logical channels, transport channels and physical channels. An RB refers to a logical path formed at L1 and L2 in the protocol stack, for data transmission between a UE and a UTRAN. In general, setup of an RB is the process of specifying radio protocol layers and channels necessary to provide a specific service and setting specific parameters and an operation scheme.

Now a description is given of dual cell High Speed Packet Access (HSPA) of UMTS and Carrier Aggregation (CA) of Long Term Evolution-Advanced (LTE-A).

Compared to the existing E-DCH on which a UE transmits data at a single frequency, dual cell HSPA doubles the amount of transmitted data by allowing a UE to transmit data simultaneously at two frequencies. An operation of transmitting data at two frequencies from the UE is referred to as a dual cell E-DCH operation. Conventionally, a UE receives a High Speed Downlink Shared Channel (HS-DSCH) at a single frequency. In contrast, an operation of simultaneously receiving an HS-DSCH at two frequencies at a UE to thereby double the amount of received data is referred to as a dual cell HSDPA operation.

In the LTE-A system, studies are being conducted on defining a carrier used in a legacy LTE system as a Component Carrier (CC) and grouping up to five CCs in order to extend a bandwidth. This technology is called CA.

Conventionally, when a UE transmits or receives data to or from a Base Station (BS) at a plurality of frequencies as is done in dual cell HSPA and CA, the UE accesses a cell in idle mode and then a network establishes an RRC connection with the UE, for one frequency. If the UE is in RRC connected state, the network transmits measurement configuration information for a plurality of frequencies to the UE. Then the UE performs cell measurement on the plurality of frequencies based on the received measurement configuration information and reports the cell measurements to the network. The BS configures a plurality of frequencies for the UE using the received cell measurements. Because the network does not configure a plurality of frequencies immediately after the idle-mode UE accesses the cell, the UE transmits or receives data at a high data rate on the plurality of frequencies after a certain time delay. Therefore, the conventional technology experiences a time delay in configuring a plurality of frequencies between a UE and a network.

SUMMARY OF THE INVENTION

As described above, the conventional technology experiences a time delay in configuring a plurality of frequencies between a UE and a network.

Accordingly, the present invention is directed to a method and apparatus for measuring a cell in a wireless communication system that substantially obviate one or more problems due to limitations and disadvantages of the related art.

An object of the present invention is to provide a method for measuring a cell in order to fast configure a plurality of frequencies between a UE and a network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of measuring a cell at a User Equipment (UE) using a plurality of frequencies in a wireless communication system includes receiving measurement configuration information on the plurality of frequencies from a network when the UE has no dedicated connection with the network, and measuring cells associated with the plurality of frequencies according to the measurement configuration information.

The method may further include transmitting at least one measurement result of the measured cells to the network.

The at least one measurement result may be transmitted through a Radio Resource Control (RRC) message during an RRC connection establishment.

The at least one measurement result may be transmitted through a dedicated message, after an RRC connection establishment is completed.

The measurement configuration information may include a cell list for the UE to measure the cells, and the cell list may include a first cell camped on by the UE and at least one second cell different from the first cell, and wherein the first cell is associated with a first frequency and the at least one second cell is associated with at least one second frequency.

The measurement configuration information may be received through a System Information Block (SIB).

In another aspect of the present invention, a method of receiving a cell measurement result of a UE using a plurality of frequencies by a network in a wireless communication system includes transmitting measurement configuration information on the plurality of frequencies to the UE, the network has no dedicated connection with the UE, and receiving at least one measurement result of cells from the UE, wherein the cells are associated with the plurality of frequencies and the cells are measured according to the measurement configuration information.

In another aspect of the present invention, a UE using a plurality of frequencies in a wireless communication system includes a reception module for receiving measurement configuration information of the plurality of frequencies from a network when the UE has no dedicated connection with the network, and a processor for measuring cells associated with the plurality of frequencies according to the measurement configuration information.

In a further aspect of the present invention, a BS in a wireless communication system includes a transmission module for transmitting measurement configuration information on a plurality of frequencies to a UE when the network has no dedicated connection with the UE, and a reception module for receiving at least one measurement result of cells from the UE, wherein the cells are associated with the plurality of frequencies and the cells are measured according to the measurement configuration information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
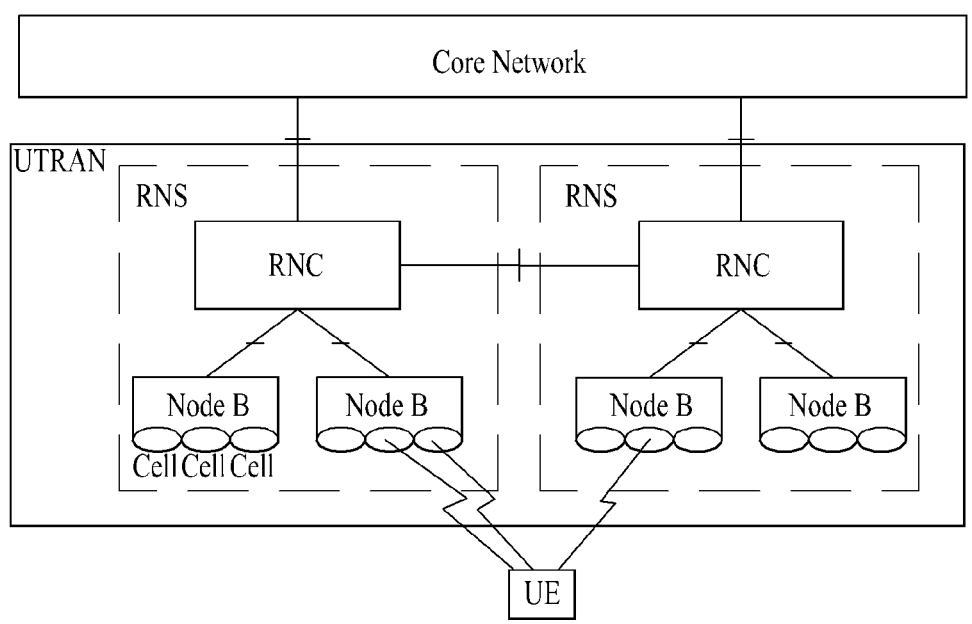
FIG. 1 illustrates a Universal Mobile Telecommunications System (UMTS) network configuration.
Figure 2:
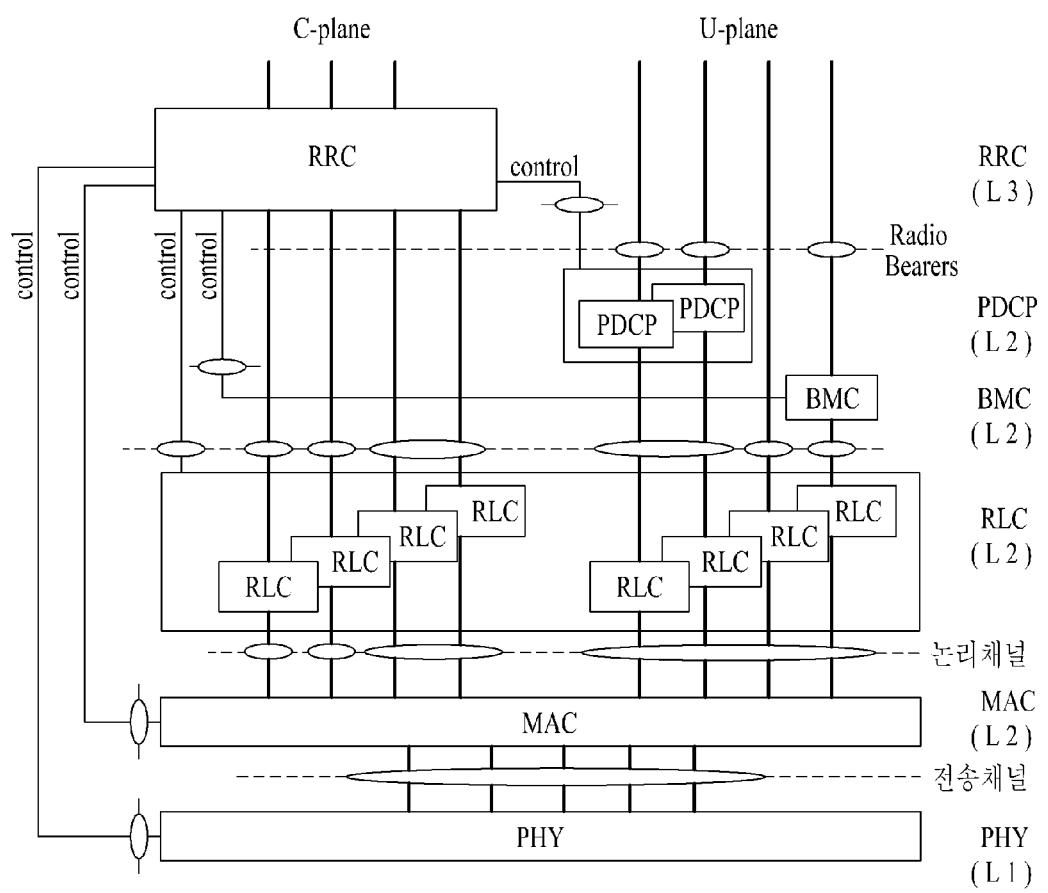
FIG. 2 illustrates a radio protocol architecture for UMTS.

Reference will now be made in detail to preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a Universal Mobile Telecommunications System (UMTS) mobile communication system is being used. However, the description is applicable to any other mobile communication system except for specific features inherent to the UMTS system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), etc. and the term 'Base Station (BS)' is assumed to refer to any node of a network end, such as a Node B, an enhanced Node B (eNB or eNode B), etc., communicating with a UE.

Cell measurement will first be described below.

Mobility support for a UE is crucial to a mobile communication system. To support mobility, a UE continuously measures the quality of a serving cell and neighbor cells and transmits the measurements to a network at an appropriate time. The network then provides optimum mobility to the UE, for example, by commanding handover to the UE based on the reported measurements.

With a frequency reuse factor of 1, mobility is supported between different cells having the same frequency. To guarantee a UE's mobility, therefore, the UE should be able to detect cells using the same frequency as its serving cell and measure the quality and cell information of these neighbor cells. The process of measuring cells using the same central frequency as a serving cell is referred to as intra-frequency measurement. The UE performs intra-frequency measurement and reports the measurement results to the network at an appropriate time.

On the other hand, a mobile communication service provider may operate a network in a plurality of frequencies. In this case, in order to ensure optimum mobility for a UE, the UE should be able to detect cells using different frequencies from the frequency of its serving cell and measure the quality and cell information of these neighbor cells. The process of measuring cells using different central frequencies from the central frequency of a serving cell is referred to as inter-frequency measurement. The UE may perform inter-frequency measurement and report the measurement results to the network at an appropriate time.

If a UE supports measurement of heterogeneous communication networks, the UE may measure cells of the heterogeneous communication networks based on a configuration set by a BS. This measurement is called inter-Radio Access Technology (RAT) measurement. From the viewpoint of a UMTS UE, LTE and GSM EDGE Radio Access Network (GERAN) based on the $3^{rd}$ Generation Partnership Project (3GPP) LTE standards or CDMA 2000 based on the 3GPP2 standards may be inter-RAT.

A UE generally has a single Transmission (TX) and Reception (Rx) circuit. In the case of intra-frequency measurement, a neighbor cell to be measured uses the same frequency as a serving cell. Therefore, the UE may measure the neighbor cell, while transmitting and receiving data to and from the serving cell. However, when performing inter-frequency measurement or inter-RAT measurement, the UE should discontinue data transmission and reception to and from the serving cell for a while, tunes to the frequency of a neighbor cell to be measured, and then measures the neighbor cell. A period of time for which data transmission and reception is discontinued should coincide between the UE and the network. Otherwise, a BS may transmit data to the UE in the frequency of the serving cell, while the UE is performing cell measurement on another frequency. As a consequence, the UE cannot receive the data from the BS and thus radio resources are wasted.

A period of time for which a UE in RRC connected state discontinues data transmission and reception to and from a BS in the frequency of a serving cell in order to measure a cell in a different frequency band or a cell of another RAT is referred to as compressed mode in UMTS and a measurement gap in LTE.

Unlike an RRC-connected UE, a UE in CELL_Forward Access Channel (CELL_FACH) state performs inter-frequency measurement or inter-RAT measurement in an FACH measurement occasion time preset between the UE and the network. A UE in CELL_Paging Channel (CELL_PCH) state, URA_PCH state, or idle mode receives data only during a Discontinuous Reception (DRX) period without transmitting data to the network, to thereby efficiently use battery power. Hence, the UE performs inter-frequency measurement or inter-RAT measurement during a non-data reception period.

A BS transmits to a UE measurement configuration information specifying what to measure, how to measure, what to report, and how to report. That is, the measurement configuration information may include information about a measurement type, a measurement object, a measurement quantity, a reporting quantity, and reporting criteria.

The measurement type specifies the type of a measurement that the UE is supposed to perform. For example, the measurement type may indicate intra-frequency measurement, inter-frequency measurement, or inter-RAT measurement.

The measurement object specifies cells that the UE is to measure. That is, the BS notifies the UE of a cell list to be measured. In the case of intra-frequency measurement, the measurement object indicates cells using the same frequency as a cell on which the UE has camped. In the case of inter-frequency measurement or inter-RAT measurement, the measurement object indicates systems and frequencies to be measured and cells using the frequencies.

The measurement quantity indicates what to measure. For example, the measurement quantity indicates Reference Signal Received Power (RSRP), Reference Signal Received Quality (RSRQ), etc.

The reporting quantity indicates what to report. In intra-frequency measurement, for instance, the reporting quantity indicates whether to report about cells of an active set, cells of a monitored set, or detected cells.

The reporting criteria specify a time when the UE is supposed to report measurements. The UE may report measurements periodically or when a certain condition is satisfied. For example, the condition may be that the received signal quality of a neighbor cell is higher than that of a serving cell or that the received signal strength of a serving cell or a neighbor cell is lower or higher than a threshold.

Now a description will be given of an operation for measuring cells at a UE in the CELL_PCH, URA_PCH or CELL_FACH state or in the idle mode. The UE receives information necessary for cell selection and reselection in a System Information Block (SIB). The SIB includes $S_{intrasearch}$ and $S_{intersearch}$ values. When the quality of a serving cell is lower than a threshold, the UE performs cell measurement. That is, if the quality of the serving cell is lower than $S_{intrasearch}$ the UE performs intra-frequency measurement. If the quality of the serving cell is lower than $S_{intersearch}$ the UE performs inter-frequency measurement. $S_{intrasearch}$ is generally larger than $S_{intersearch}$.

Figure 3:
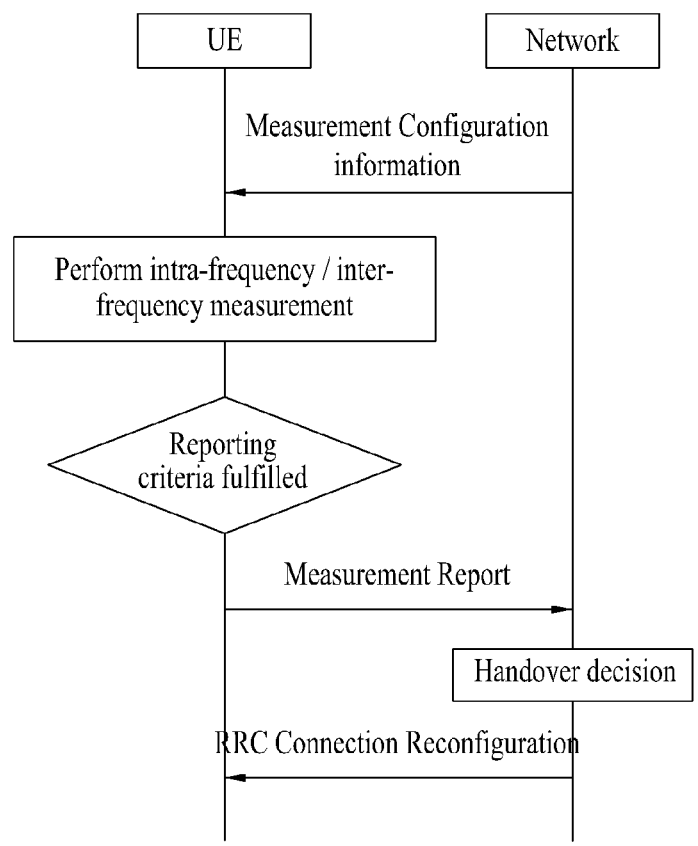
FIG. 3 illustrates an operation for establishing a channel according to cell measurements.

With reference to FIG. 3, an operation for establishing a cell by a BS according to measurement results received from a UE will be described. FIG. 3 illustrates an operation for establishing a channel according to cell measurements.

Referring to FIG. 3, a network transmits measurement configuration information to a UE and the UE performs cell measurement according to the measurement configuration information. Specifically, the UE may perform intra-frequency measurement and/or inter-frequency measurement according to the measurement configuration information and may measure the signal power or signal quality of cells indicated by the measurement configuration information.

If reporting criteria are satisfied, the UE reports measurement results to the network. The network establishes a channel with the UE based on the measurement results of a serving cell and neighbor cells reported by the UE.

In UMTS, a BS transmits measurement configuration information commonly to all UEs within a cell or to a particular UE, in an SIB. In contrast, a BS transmits measurement configuration information only to a particular UE in LTE.

Because a UE receives measurement configuration information in an SIB, the UE may notify a network of cell information measured by the UE in an RRC Connection Request message or another RRC message in the UMTS system. Alternatively or additionally, when the UE is placed in CELL_Dedicated Channel (CELL_DCH) state, the UE may transmit the cell information in a Measurement Report message.

In the case where the UE transmits the measured cell information to the network in the RRC Connection Request message, the network may indicate cells about which the UE is supposed to report. In intra-frequency measurement, for example, the network may command the UE to report measurements of a serving cell or the measurements of a serving cell and a monitored cell and may indicate the number of monitored cells to be reported, thereby indicating a maximum number of cells to be reported. In addition, the network may notify the UE of a threshold for inter-frequency measurement so that the UE may report measurement results if the cell measurements are greater than the threshold.

Dual cell HSPA will be described below with reference to FIG. 4.

Figure 4:
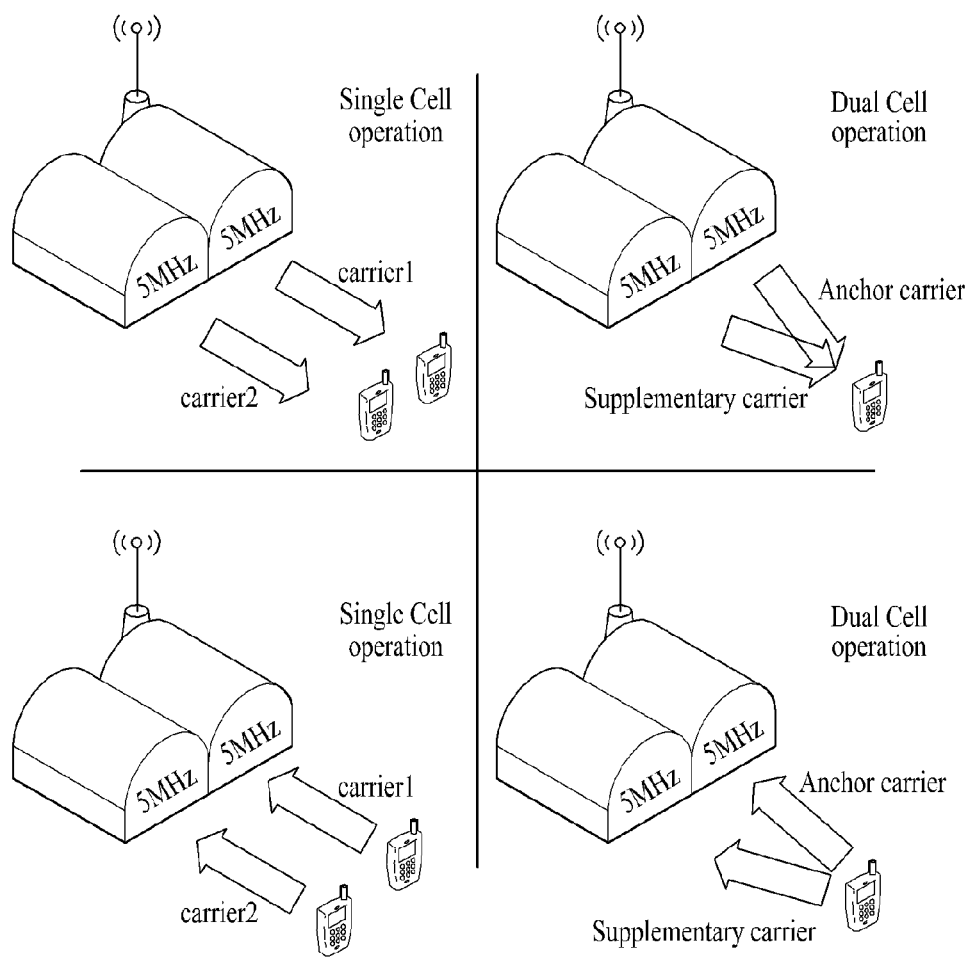
FIG. 4 illustrates dual cell High Speed Packet Access (HSPA).

FIG. 4 illustrates dual cell HSPA.

Referring to FIG. 4, conventionally, a UE transmits an E-DCH at a single frequency, while a UE transmits data simultaneously at two frequencies in dual cell HSPA, thus doubling the amount of transmitted data. In dual cell HSPA, the UE may transmit data at up to 20 Mbps and the simultaneous data transmission at two frequencies is referred to as a dual cell E-DCH operation.

The same thing applies to a downlink. That is, while a UE conventionally receives an HS-DSCH at a single frequency, it receives data at two frequencies in dual cell HSPA, thereby doubling the amount of received data. In dual cell HSPA, the UE may receive data at up to 80 Mbps and the simultaneous data reception at two frequencies at a UE is called a dual cell HSDPA operation. A single UE can receive a fourfold amount of data simultaneously at four frequencies, relative to the basic HS-DSCH. Thus the UE may receive data at up to 160 Mbps and this is referred to as a four-carrier HSDPA operation.

In dual cell HSPA, a cell from which a UE receives a downlink control signal needed for data transmission at a primary uplink frequency is called a serving HS-DSCH cell or a primary serving HS-DSCH cell. A cell other than the serving HS-DSCH cell, from which the UE receives data, is called a secondary serving HS-DSCH cell. The primary uplink frequency is defined as an uplink frequency having a High Speed Dedicated Physical Control Channel (HS-DPCCH) that carries an ACKnowledgment/Negative ACKnowledgment (ACK/NACK) for received downlink data.

Figure 5:
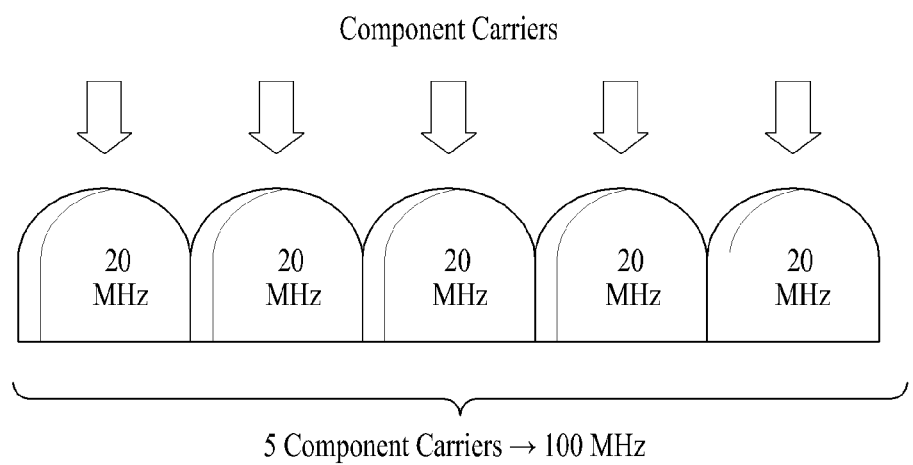
FIG. 5 illustrates Carrier Aggregation (CA) in a Long Term Evolution-Advanced (LTE-A) system.

With reference to FIG. 5, LTE-A CA will be described. FIG. 5 illustrates CA in an LTE-A system.

The LTE-A technology standard, a candidate for International Telecommunication Union (ITU) IMT-Advanced, is designed to suit the requirements of ITU IMT-Advanced. Therefore, bandwidth extension from the legacy LTE system is under discussion. To extend a bandwidth, a carrier used in the legacy LTE system is defined as a Component Carrier (CC) and grouping up to 5 CCs has been discussed in the LTE-A system. A CC may have a bandwidth of up to 20 MHz as in the LTE system and thus the bandwidth can be extended up to 100 MHz. The technique of grouping a plurality of CCs is called CA.

In CA, there are primary serving cell (Pcell) and a secondary serving cell (Scell) for a UE. The primary serving cell is a cell that the UE has camped on or that the network indicates in an SIB cell-commonly. The secondary serving cell is a cell other than the primary serving cell, from which the UE can receive data.

Figure 6:
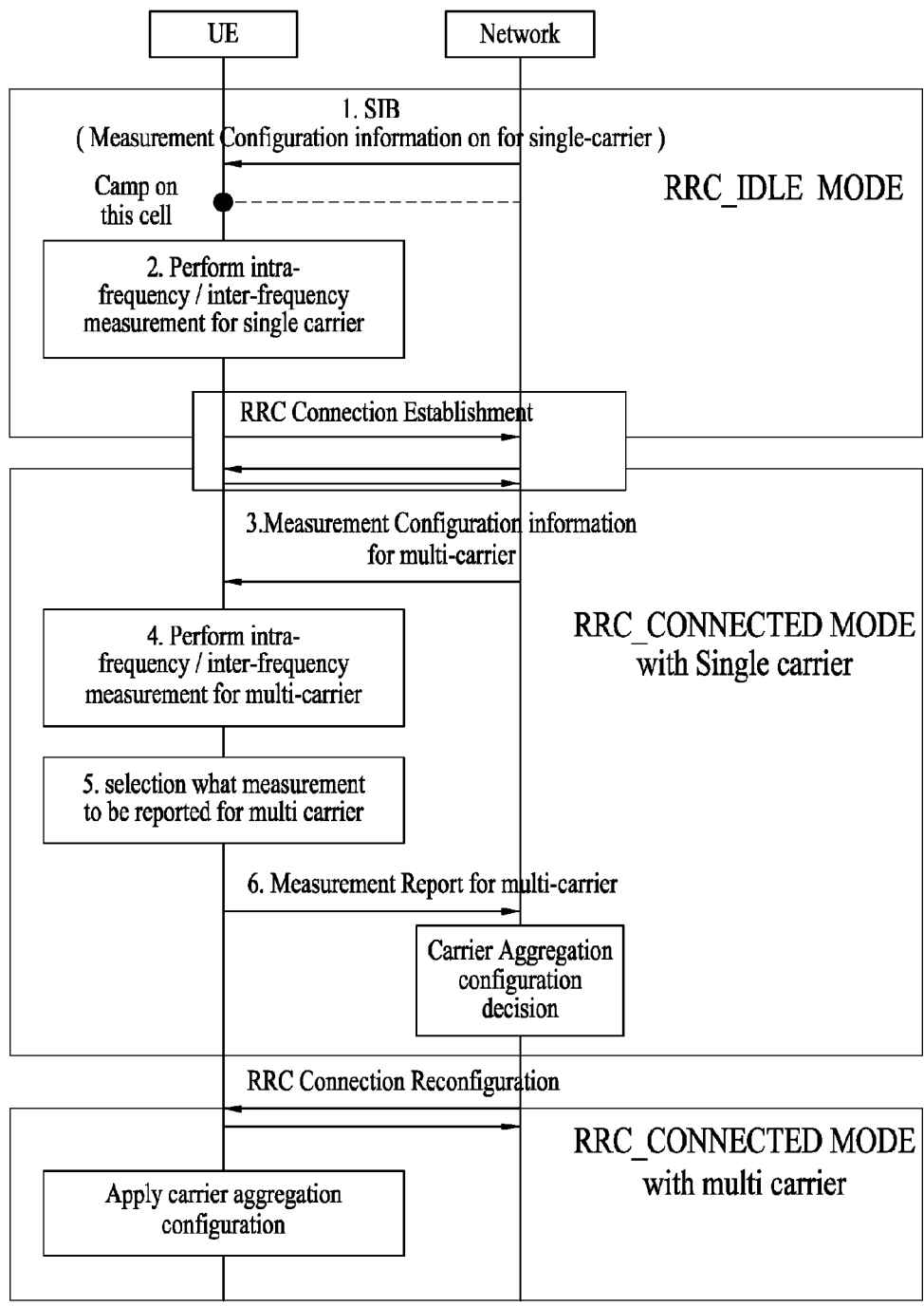
FIG. 6 illustrates an operation for establishing a channel for a plurality of frequencies.

An operation for establishing a channel for a plurality of frequencies according to cell measurements received from a UE using the plurality of frequencies in a network will be described with reference to FIG. 6. FIG. 6 illustrates an operation for establishing a channel for a plurality of frequencies.

Referring to FIG. 6, upon receipt of an SIB message from a network, an idle-mode UE should search for the best cell and camp on the detected cell. Accordingly, the UE performs cell measurement to select or reselect an appropriate cell. Measurement configuration information included in an SIB is for a cell on which the UE has camped. Then the UE and the network enter RRC connected mode by performing an RRC connection setup for the camped-on cell.

Upon receipt of measurement configuration information for a plurality of frequencies from the network in order to configure CA or dual cell HSPA, the UE performs cell measurement based on the received measurement configuration information. Herein, the network transmits the measurement configuration information according to the capabilities of the UE. That is, the measurement configuration information for a plurality of frequencies is transmitted only to a UE supporting a plurality of frequencies. When the BS instructs intra-frequency measurement for each of frequencies which the UE can measure while it is transmitting and receiving data, the UE performs the intra-frequency measurement on each frequency. If reporting criteria indicated by the network are satisfied, the UE reports measurement results to the network and the network establishes a channel for a plurality of frequencies based on the measurement report.

The channel establishment for a plurality of frequencies is carried out in the same manner in both the LTE and UMTS systems.

A cell measurement method according to an embodiment of the present invention will be described below with reference to FIGS. 7, 8 and 9.

According to the embodiment of the present invention, in the case where without a dedicated connection to a network, a UE requests a connection to the network, the UE measures cells for a plurality of frequencies available for dual cell HSPA or CA and transmits information about the measurements of the cells to the network at one time. Then the network may fast configure dual cell HSPA or CA for the UE based on the received measurements of the cells.

A dedicated connection to a network does not exist for an RRC idle-mode UE in the LTE system, and for a UE in RRC idle mode, CELL_PCH state, URA_PCH state, or CELL_FACH state in the UMTS system.

In the LTE system, for handover, the network notifies the UE of a target cell. The UE then resets a MAC layer and a PHY layer and performs a Ranging Access Channel (RACH) procedure. During the RACH procedure with the target cell or when the RACH procedure is successful, the UE reads an SIB received from the target cell. In the case where the UE does not have a connection with either of a serving cell and the target cell, the UE reads an SIB received from the target cell during the RACH procedure with the target cell. Hence, there is no dedicated connection between the UE and the network in this case. However, when an LTE terminal performs handover, it is said that the UE is in RRC connected state.

In the present invention, even when an LTE terminal reads an SIB received from a target cell during an RACH procedure for handover as well as when a UE without a dedicated connection to a network requests a connection to the network, the UE measures cells for a plurality of frequencies available for dual cell HSPA or CA and notifies the network of the measurements of the cells at one time. Then the network may fast configure dual cell HSPA or CA for the UE based on the received cell measurements.

Figure 7:
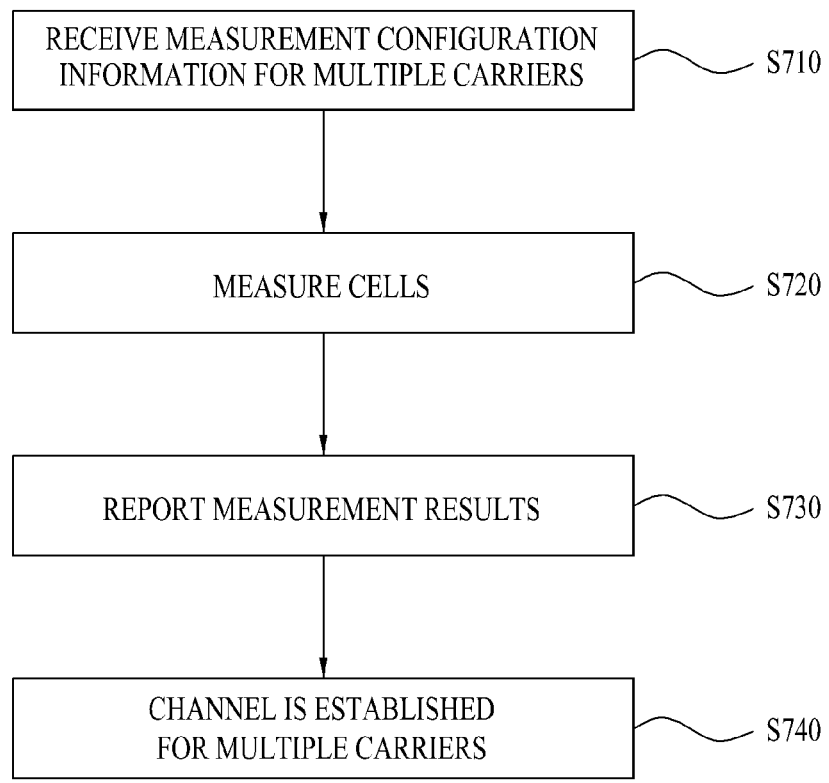
FIG. 7 is a flowchart illustrating a cell measurement method according to an embodiment of the present invention.

FIG. 7 is a flowchart illustrating a cell measurement method according to an embodiment of the present invention.

Referring to FIG. 7, without a dedicated connection to a network, a UE receives measurement configuration information for a plurality of frequencies from a BS (S710). In UMTS, the BS may transmit the measurement configuration information for a plurality of frequencies in an SIB.

The measurement configuration information may specify a measurement object, a measurement quantity, reporting criteria, reporting quantity (e.g. the number of cells whose measurements are to be reported), etc.

The measurement object may indicate a cell list, a frequency list or a list of cell and frequency combinations, for measurement. The cell list may list cells using the same frequency as a cell on which the UE has camped and cells using different frequencies from the frequency of the camped-on cell.

The measurement quantity may indicate an RSRP threshold or an RSRQ threshold. In the case where the UE measures the RSRPs of neighbor cells, if RSRP measurements are higher than the RSRP threshold, the UE may report the RSRP measurements. In the case where the UE measures the RSRQs of neighbor cells, if RSRQ measurements are higher than the RSRQ threshold, the UE may report the RSRQ measurements.

The reporting criteria specify when to transmit measurements and what message to use for transmitting the measurements. The UE may report the measurements during an RRC connection setup, during a cell update after the RRC connection setup, or when a reporting event occurs after the RRC connection setup. The measurement configuration information includes information about the reporting event. Conventional measurement-related events that trigger measurement reporting may still be used as measurement reporting events in the embodiment of the present invention.

The UE performs cell measurement according to the received measurement configuration information (S720).

If the cell list included in the measurement configuration information contains cells using frequencies different from the frequency of a camped-on cell, the UE determines whether to report the measurements of the frequencies different from the frequency of the camped-on cell according to its capabilities. Specifically, when the UE supports multi-carrier communication or multi-cell communication as in dual cell HSPA or CA, the UE determines to report the measurements of the frequencies different from the frequency of the camped-on cell and measures cells using a plurality of frequencies listed in the cell list.

On the other hand, when the UE does not support multi-carrier communication or multi-cell communication unlike dual cell HSPA or CA, the UE determines that it is not necessary to report the measurements of frequencies different from the frequency of the camped-on cell. Thus, if the cell list included in the measurement configuration information contains cells using frequencies different from the camped-on cell, the UE measures only cells using the same frequency as the camped-on cell.

The UE reports the cell measurements to the BS (S730).

The UE selects measurements to be reported according to the measurement quantity included in the measurement configuration information and reports the selected measurements according to the reporting criteria indicated by the measurement configuration information.

The UE may report the measurements to the BS in an RRC message during an RRC connection setup or during a cell update, or in a dedicated message such as a Measurement Report message after the RRC connection setup.

Figure 8:
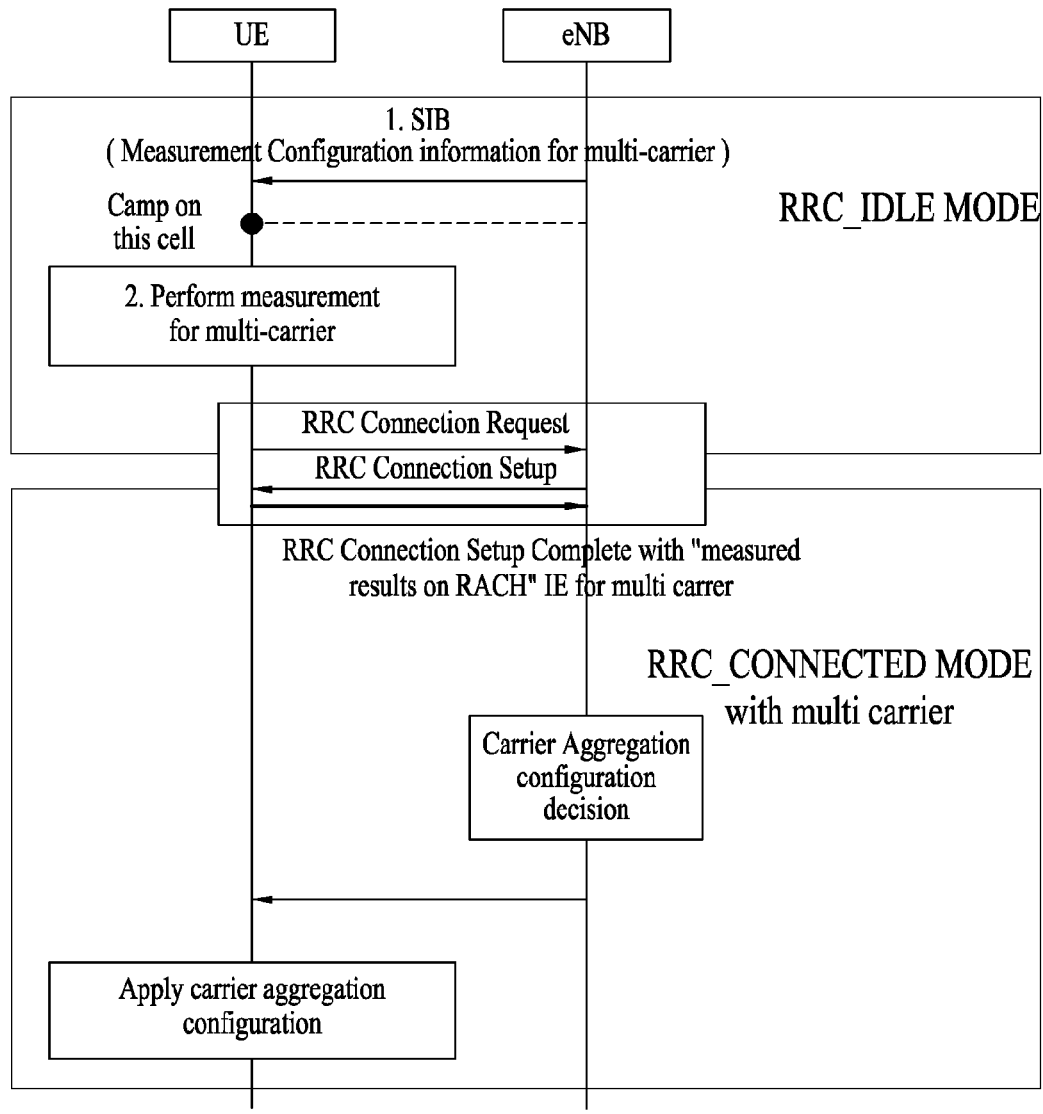
FIG. 8 illustrates a case where measurements are reported during setup of a Radio Resource Control (RRC) connection.

FIG. 8 illustrates a case where measurements are reported during an RRC connection setup. Referring to FIG. 8, the UE may transmit cell measurements in a Measured Results on RACH Information Element (IE) of an RRC Connection Setup Complete message. If the UE measures cells using the frequency of a camped-on cell and cells using frequencies different from the frequency of the camped-on cell, the UE may include all of the measurement results of the plurality of frequencies in the Measured Results on RACH IE.

If the UE measures cells using the frequency of a camped-on cell and cells using frequencies different from the frequency of the camped-on cell, the UE may report the measurements of the cells using frequencies different from the frequency of the camped-on cell to the BS, only if the measurements are greater than a threshold indicated by the received measurement configuration information.

If the measurement configuration information indicates the number of cells to be measured and reported, the UE measures as many cells as the indicated number and reports the measurements of the cells. If the number of measured cells is larger than the indicated number, the UE reports as many cells as the indicated number to the BS in a descending order of radio quality.

Figure 9:
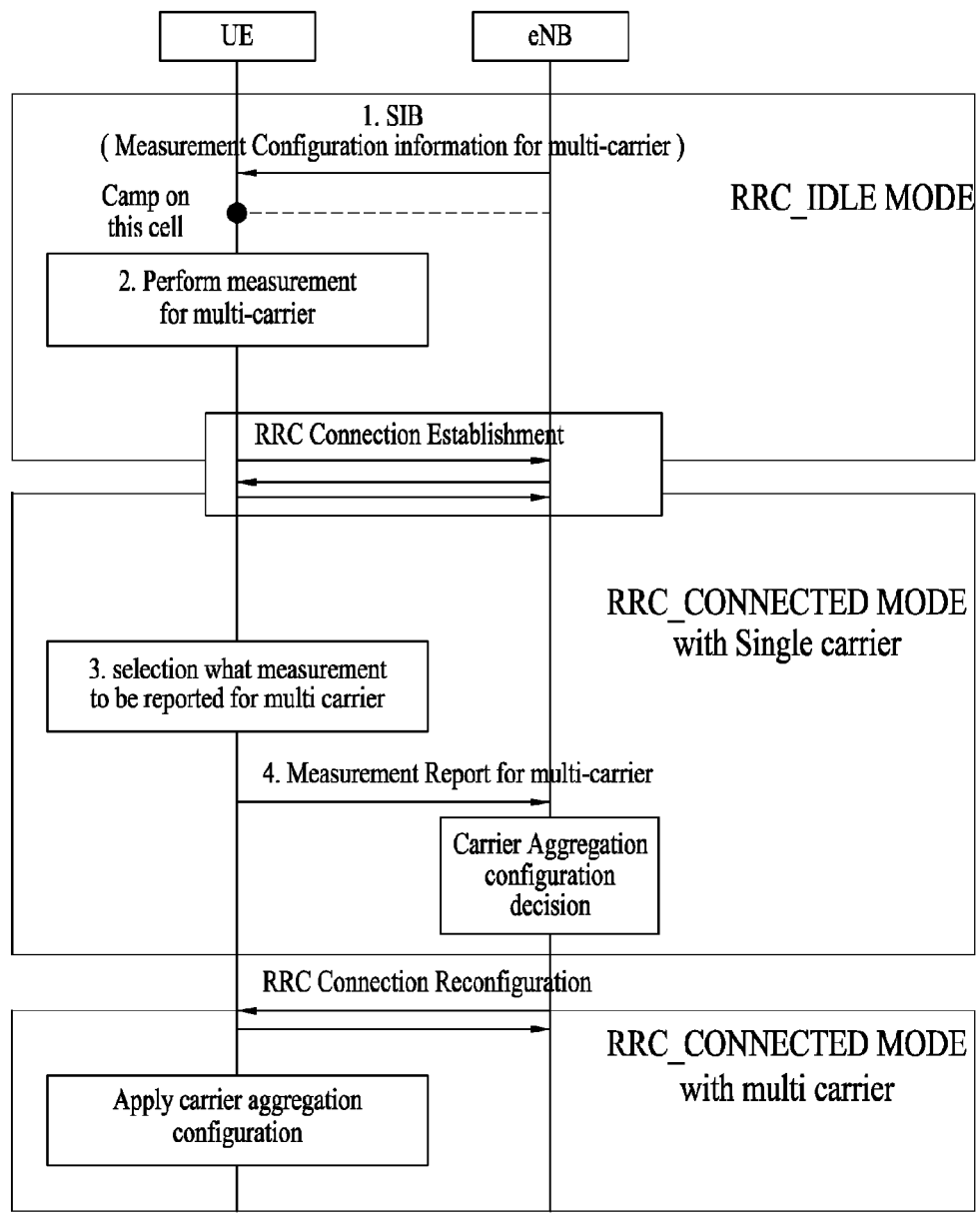
FIG. 9 illustrates a case where measurements are reported in RRC connected mode.

FIG. 9 illustrates a case where measurements are reported in RRC connected mode. Referring to FIG. 9, the UE may transmit measurement results to the BS in a dedicated message such as a Measurement Report message in RRC connected mode. If the UE measures cells using the frequency of a camped-on cell and cells using frequencies different from the frequency of the camped-on cell, the UE may transmit all of the measurement results of the cells for the plurality of frequencies at one time in a Measurement Report message.

In FIG. 9, the UE measures all cells listed in a cell list included in the measurement configuration information received from the BS. Even in the RRC connected mode, the UE retains the measurement configuration information received in the idle mode, without deleting it.

Upon occurrence of a measurement reporting event indicated by the measurement configuration information, the UE may report all of the measurement results of the cells for a plurality of frequencies in a Measurement Report message. For example, the UE may transmit the measurement results periodically or if the received signal qualities of neighbor cells are higher than that of a serving cell.

The BS establishes a multi-carrier channel for the UE (S740). That is, the BS establishes a channel for CA or dual cell HSPA for the UE based on the reported measurement results.

Figure 10:
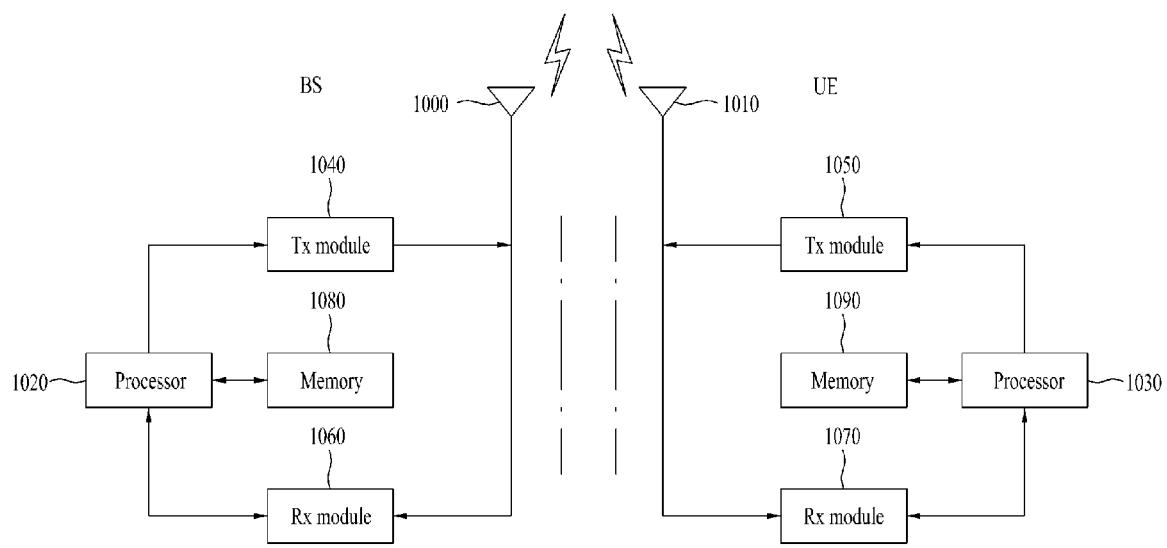
FIG. 10 is a block diagram of a Base Station (BS) and a User Equipment (UE) for implementing the embodiments of the present invention.

FIG. 10 is a block diagram of a BS and a UE for implementing the embodiments of the present invention.

Referring to FIG. 10, the BS and the UE include antennas 1000 and 1010 for transmitting and receiving information, data, signals and/or messages, Transmission (Tx) modules 1040 and 1050 for transmitting messages by controlling the antennas 1000 and 1010, Reception (Rx) modules 1060 and 1070 for receiving messages by controlling the antennas 1000 and 1010, memories 1080 and 1090 for storing information related to communication with the UE and the BS, and processors 1020 and 1030 for controlling the Tx modules 1040 and 1050, the Rx modules 1060 and 1070, and the memories 1080 and 1090.

The antennas 1000 and 1010 transmit signals generated from the Tx modules 1040 and 1050 over the air or transmit signals received over the air to the Rx modules 1060 and 1070. When Multiple Input Multiple Output (MIMO) is supported, each of the UE and the BS may have two or more antennas.

In general, the processors 1020 and 1030 provide overall control to the BS and the UE. Particularly, the processors 1020 and 1030 may perform a control function, a Medium Access Control (MAC) frame conversion control function according to service characteristics and a propagation environment, a handover function, and an authentication and encryption function in order to perform the above-described embodiments of the present invention. In addition, each of the processors 1020 and 1030 may further include an encryption module for controlling encryption of various messages and a timer module for controlling transmission and reception of various messages.

The processor 1030 of the UE measures cells using a plurality of frequencies according to measurement configuration information received from the BS.

The Tx modules 1040 and 1050 may encode and modulate a signal and/or data scheduled by the processors 1020 and 1030 in a predetermined MCS and transmit the modulated signal and/or data to the antennas 1000 and 1010.

The Tx module 1050 of the UE transmits the measurement results of the cells using the plurality of frequencies according to the measurement configuration information.

Without a dedicated connection between the UE and a network, the Tx module 1040 of the BS transmits the measurement configuration information for the plurality of frequencies to the UE using the plurality of frequencies.

The Rx modules 1060 and 1070 may recover original data by decoding and demodulating radio signals received through the antennas 1000 and 1010 and may transmit the original data to the processors 1020 and 1030.

The Rx module 1070 of the UE receives the measurement configuration information for the plurality of frequencies from the BS, without a dedicated connection between the UE and the network.

The Rx module 1060 of the BS receives from the UE the measurement results of the cells using the plurality of frequencies that the UE measured according to the measurement configuration information.

The memories 1080 and 1090 may store programs for processing and controlling in the processors 1020 and 1030 and temporarily store input/output data (an uplink grant allocated by a BS, system information, a Station Identifier (STID), a Flow ID (FID), an action time, resource allocation information, and frame offset information in the memory 1090 of the UE).

Also, each of the memories 1080 and 1090 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Static RAM (SRAM), a Read-Only Memory (ROM), an Electrically Erasable Programmable Read-Only Memory (EEPROM), a Programmable Read-Only Memory (PROM), a magnetic memory, a magnetic disc, and optical disk.

As is apparent from the above description of the embodiments of the present invention, when a UE requests a connection to a network without a dedicated connection between the UE and the network, the UE notifies a BS of measurement results of cells for a plurality of frequencies at one time. Therefore, the plurality of frequencies can be fast configured between the UE and the network.

Those skilled in the art will appreciate that the present invention may be carried out in other specific ways than those set forth herein without departing from the spirit and essential characteristics of the present invention. For example, those skilled in the art may combine components of the above-described embodiments of the present invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of measuring a cell at a User Equipment (UE) using a plurality of frequencies in a wireless communication system, the method comprising:
receiving measurement configuration information about the plurality of frequencies from a network when the UE has no dedicated connection with the network, wherein the measurement configuration information includes a cell list for the UE to measure cells, the cell list including a first cell camped on by the UE and at least one second cell different from the first cell, and wherein the first cell is associated with a first frequency and the at least one second cell is associated with at least one second frequency;
measuring cells associated with the plurality of frequencies according to the measurement configuration information before the UE transmits any connection request;
transmitting a measurement result report of the measured cells to the network by using the first frequency; and
receiving channel configuration information related to the first frequency defined as a primary uplink frequency,
wherein the measurement configuration information further includes information about the number of cells to be reported, and
wherein, if the number of measured cells is larger than the number of cells to be reported, the measurement result report comprises one or more measurement results as many as the number of cells to be reported in a descending order of radio quality.

2. The method according to claim 1, wherein the measurement result report is transmitted through a Radio Resource Control (RRC) message during an RRC connection establishment.

3. The method according to claim 1, wherein the measurement result report is transmitted through a dedicated message, after an RRC connection establishment is completed.

4. The method according to claim 1, wherein the measurement configuration information is received through a System Information Block (SIB).

5. A User Equipment (UE) using a plurality of frequencies in a wireless communication system, the UE comprising:
   at least one antenna;
   a reception module for receiving measurement configuration information about the plurality of frequencies from a network via the at least one antenna, the UE has no dedicated connection with the network, wherein the measurement configuration information includes a cell list for the UE to measure cells, the cell list including a first cell camped on by the UE and at least one second cell different from the first cell, and wherein the first cell is associated with a first frequency and the at least one second cell is associated with at least one second frequency, and wherein the measurement configuration information further includes information about the number of cells to be reported;
   a processor for measuring cells associated with the plurality of frequencies according to the measurement configuration information before the UE transmits any connection request; and
   a transmission module for transmitting a measurement result report of the measured cells to the network via the at least one antenna by using the first frequency,
   wherein the reception module is further configured to receive channel configuration information related to the first frequency defined as a primary uplink frequency;
   wherein, if the number of measured cells is larger than the number of cells to be reported, the measurement result report comprises one or more measurement results as many as the number of cells to be reported in a descending order of radio quality.

6. The UE according to claim 5, wherein the transmission module transmits the measurement result report to the network through a Radio Resource Control (RRC) message during an RRC connection establishment via the at least one antenna.

7. The UE according to claim 5, wherein the transmission module transmits the measurement result report to the network through a dedicated message via the at least one antenna, after an RRC connection establishment is completed.

* * * * *